United States Patent [19]

Calvin

[11] Patent Number: 5,042,190
[45] Date of Patent: Aug. 27, 1991

[54] FLY-FISHING STRIKE INDICATOR

[76] Inventor: Larry Calvin, P.O. Box 1706, Bozeman, Mont. 59715

[21] Appl. No.: 477,044

[22] Filed: Feb. 7, 1990

[51] Int. Cl.⁵ ............................................. A01K 91/00
[52] U.S. Cl. .................... 43/43.1; 43/43.14; 43/44.91.44.95
[58] Field of Search ............... 43/43.1, 43.11, 43.14, 43/43.15, 42.72, 17, 44.87, 44.9, 44.91, 44.92, 44.95, 44.89

[56] References Cited

U.S. PATENT DOCUMENTS

| | | | |
|---|---|---|---|
| 3,104,487 | 9/1963 | Havel | 43/43.11 |
| 3,184,880 | 5/1965 | Ratte | 43/44.95 |
| 3,717,907 | 2/1973 | Klein | 43/44.9 |
| 3,744,176 | 7/1973 | Bondhus | 43/43.14 |
| 3,988,852 | 11/1979 | Klein | 43/44.91 |
| 4,942,689 | 7/1990 | Link | 43/44.9 |

Primary Examiner—Richard K. Seidel
Assistant Examiner—James Miner
Attorney, Agent, or Firm—Richard C. Conover

[57] ABSTRACT

A fly-fishing strike indicator which is moveable on a fishing leader but at the same time can maintain its position on the leader when a fly is cast. The indicator is constructed by forming a knot of surgical tubing on the leader. The knot being formed by passing one end of a leader through the center passage of a small section of surgical tubing and looping the leader outside the tubing and then reinserting the leader through the center passage of the tube in the same direction as before. As the leader is pulled taut, the resilient tube is deformed into a knot wherein the leaders runs nearly straight through the knot. Further, a cover of thermoplastic, heat shrinkable tubing is slid over the knot to surround the leader and the knot. The ends of the thermoplastic cover are then heated to constrict the ends loosely about the leader and to form an air pocket between the leader and cover.

10 Claims, 2 Drawing Sheets

FLY-FISHING STRIKE INDICATOR

BACKGROUND OF THE INVENTION

This invention relates to an improved strike indicator for fly fishing which is simple to manufacture, lightweight, and frictionally adjustable along a fly-fishing leader or line.

In fly fishing, the line and leader provide the weight required for casting a fly, and any additional weight if added changes the casting characteristic of the fly line. Conventional "bobbers" are generally not used in fly fishing because of the weight limitation imposed by the above constraint. It is an essential requirement for a fish strike indicator that the weight of the indicator be compatible and in balance with the weight of the fly line and the leader.

Fly fishermen also often use a wet fly which sinks after the fly is cast into water. Whenever a fish takes a fly, the fish will attempt to spit out the fly abruptly once the fly is in its mouth. A fish strike indicator is used to alert a fisherman, during the short interval a fish has a fly in its mouth, that a fish has taken the fly so that the fisherman can set the hook. The problem is to provide a visible indicator for the fisherman while at the same time keeping the indicator sufficiently small and lightweight to match the characteristics of the fly line and leader. Heavier fishing rigs have for years used casting bubbles, or "bobbers", to alert a fisherman that a fish has struck a lure, but this type of equipment is almost useless in fly fishing because of the weight problem.

Certain techniques have traditionally been used to provide lightweight and visible strike indicators, but the indicators so provided are usually not adjustable along a fly leader. One technique often used is to color the tip of a fly line for a few inches just before the attachment with the leader to make the fly line more visible. The disappearance of the colored portion of the line indicates a strike. Another technique is to use highly visible tape attached to the leader to provide the strike indication. But, neither of these techniques provide an indicator easily adjustable along a leader.

A casting bubble of the type which might be used on a heavier fishing rig and one that is adjustable is illustrated in Bondhus U.S. Pat. No. 3,744,176. This patent illustrates a device which has a resilient tube enclosed in a rigid shell wherein the resilient tube can frictionally grip a leader passing through the center of the tube. This type of casting bubble, which can be adjusted along the leader, requires that a fisherman twist a plug at one end of the casting bubble to change the frictional force between the casting bubble and the leader. As the components of such a casting bubble are made small enough to be useful in fly fishing, however, the problem of manipulating such small components so as to adjust the frictional force between the casting bubble and the leader becomes an increasingly difficult task for a fisherman.

A strike indicator which is lightweight and adjustable in position along the leader, but one which grips the leader with enough frictional force to remain fixed during subsequent fly casts, is still needed. The improved fish strike indicator according to the present invention is simple to manufacture, is light in weight so as to not disturb the casting characteristics of a fly line and leader and is easily adjustable along a leader. Further, the indicator has sufficient gripping strength to remain in position on the leader even during the casting process. This indicator is formed so as to not require manipulation of components to adjust the gripping strength between the indicator and the leader, and is sufficiently small and supple to pass through the guides of a fly-fishing rod as the line, the leader, and the strike indicator are reeled in for transport or storage.

SUMMARY OF INVENTION

The present invention relates to a fish strike indicator which is adjustable along a fishing leader but can maintain its position on the leader when a fly is cast. The indicator, according to a preferred embodiment of the present invention, is constructed by passing one end of a leader through the center passage of a small section of resilient tube, such as a surgical tube, looped around the outside surface of the tube and then reinserted through the center passage of the tube in the same direction as before. As the leader is pulled taut, the resilient tube is deformed into a knot wherein the leader runs nearly straight through the knot. With this configuration, the knot can be moved on the leader by applying sufficient force to overcome the friction between the knot and the leader. A cover of thermoplastic, heat-shrinkable tubing is slid over the knot to surround the leader and the knot. The ends of the thermoplastic cover are then heated to constrict the ends loosely about the leader and to form an air pocket between the leader and the cover. Air trapped in the cover makes the strike indicator buoyant. Any water leaking through the ends of the cover between the cover and the leader will be forced out through the loosely fitting openings on a subsequent cast of the leader so that the fish strike indicator will remain buoyant during use.

BRIEF DESCRIPTION OF THE DRAWINGS

In order that the invention may be clearly understood and readily carried into effect, preferred embodiments of the invention will now be described, by way of example only, with reference to the accompanying drawings wherein.

DESCRIPTION OF PREFERRED EMBODIMENTS OF THE INVENTION

Figure 1:
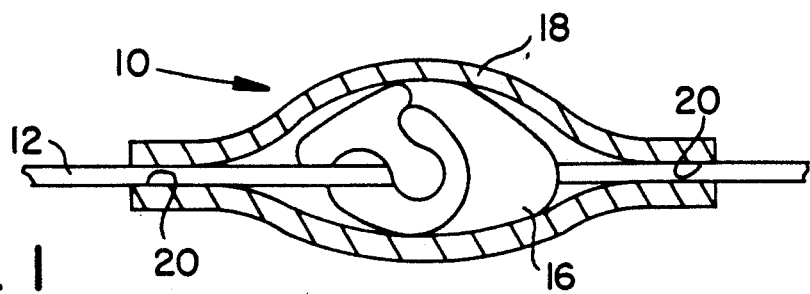
FIG. 1 is an elevational view of the strike indicator according to the present invention with the tubular cover shown in section to show the encased knot inside.
Figure 2:
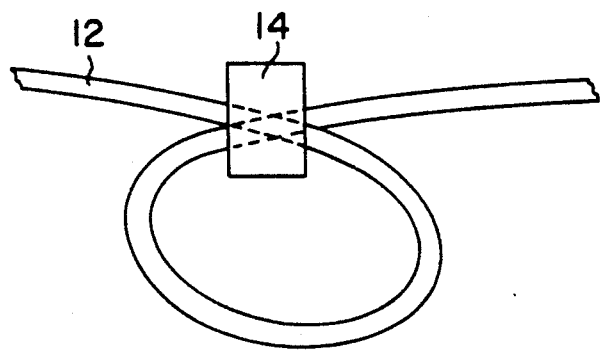
FIG. 2 is a detail view which illustrates the formation of a knot according to a preferred embodiment of the present invention.
Figure 3:
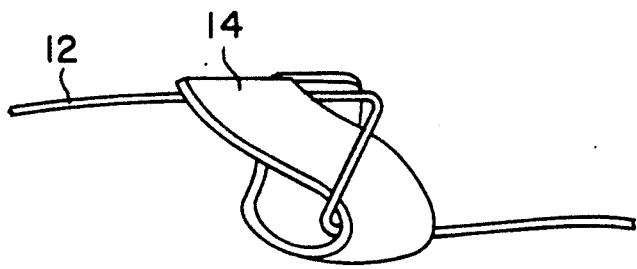
FIG. 3 illustrates the leader shown in FIG. 2 being pulled taut with the resilient tube on the leader.
Figure 4:
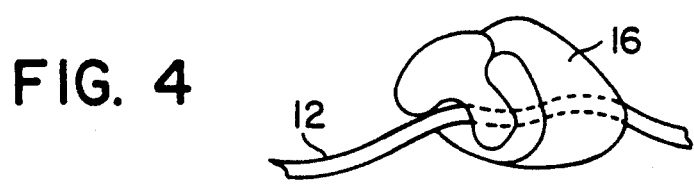
FIG. 4 illustrates the knot formed by pulling the leader shown in FIG. 2 to its maximum extension.

A preferred embodiment of the fish strike indicator 10 is illustrated in FIG. 1. A knot 16 is formed, as best seen in FIG. 2, by threading an end of leader 12 through a center passage of a short section of a resilient tube 14, which in the preferred embodiment is surgical tubing, and looping the leader 12 outside tube 14 and then threading the end of leader 12 again through the center passage of tube 14 in the same direction. Leader 12 is then pulled taut as shown in FIGS. 3 and 4, so as to deform resilient tube 14 into knot 16. In this configuration, the leader 12 passes through knot 16 in a moderately straight line. Knot 16 frictionally grips leader 12 by surrounding leader 12 but in a manner that permits knot 16 to be moved along the leader once the frictional force, created by tube 14 being in tension, is overcome.

A tubular, external cover 18, shown in FIG. 1, is made from a highly-visible, heat-shrinkable, thermoplastic material with knot 16 positioned inside external cover 18. With knot 16 in place, the ends of thermoplastic cover 18 are constricted by heating to shrink the ends of cover 18 around leader 12 as at 20. Other equivalent means of constricting the ends of cover 18 include encircling the ends of cover 18 with cord and tying the cord in place, or encircling the ends of cover 18 with elastic bands to constrict the ends of cover 18 in a loosely fitting relationship at ends 20. An airspace is thus formed between cover 18 and leader 12 to provide buoyancy to the strike indicator. Some water may still enter the enclosed space through the openings at 20, but the water may be removed on subsequent casts of the leader, because the openings at 20 only loosely surround leader 12, and the force of the cast expels any water in the airspace through loosely-fitting openings at 20.

Figure 7:
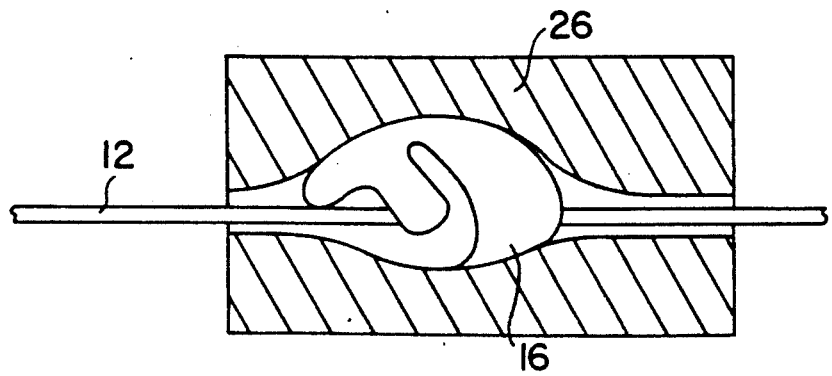
FIG. 7 is a side view of a third embodiment with a buoyant cover shown in cross-section.

An alternative cover 26, as shown in FIG. 7, could be made of a buoyant material, such as foam rubber, to encase knot 16. The buoyant material is sized to float knot 16 when the indicator is placed in water.

Figure 5:
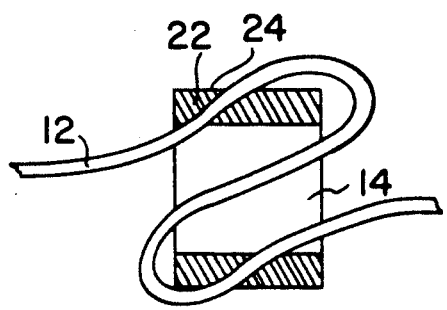
FIG. 5 is a side-view of an alternate knot of a second embodiment of the present invention with the resilient tube shown in cross-section.
Figure 6:
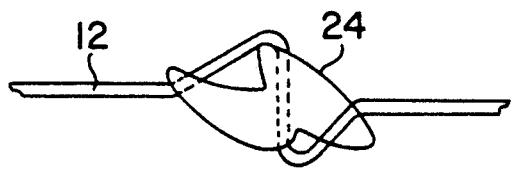
FIG. 6 illustrates the knot formed as shown in FIG. 5 deformed by pulling the leader to its maximum extension.

Other equivalent knots can also be used such as shown in FIG. 5. In this knot, leader 12 is inserted into the center passage of tube 14 at a first end. Leader 12 is then threaded through wall 22 of tube 14 to exit outside wall 22 of tube 14. Leader 12 is then looped around the other second end of tube 14, and reintroduced into the center passage in a direction opposite the original entry into the center passage. At the first end, leader 12 is looped around the end wall of tube 14 and threaded from the outside through wall 22 into the center passage as shown. Leader 12 is then directed from the center passage out the second end of tube 14. When leader 12 is pulled taut, a knot 24 is formed which frictionally grips leader 12. Knot 24 is adjustable along leader 12 and can be moved along leader 12 whenever sufficient force is applied to move strike indicator 10.

Another type of knot could be formed by tying an overhand knot with a piece of elongate resilient material on leader 12. Clipping the ends of the resilient material will form a compact knot 16.

Alternatively, a loop of leader 12 could be inserted through the center passage of resilient tube 14 with the loop extending out an end of tube 14. The loop could then be caught by means of a bar restraint passing through the loop with the bar resting against the end wall of the tube 14. Leader 12 could subsequently be pulled taut to straighten leader 12 around the restraint and deform tube 14 to form a knot having a frictional bond with leader 12.

In operation the fish strike indicator is constructed on a piece of leader that is tied to a fly. The distance between the fly and the fish strike indicator is then adjusted by having the fisherman exert sufficient force to overcome the friction between leader 12 and knot 16. Casting is accomplished normally and the frictional grip of the strike indicator serves to keep the indicator in place. If water seeps into the space enclosed by cover 18, the force of subsequent casts will expel water from the enclosed space through one of the openings at 20 leaving the strike indicator 10 with its original buoyancy.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A fish strike indicator in combination with a fishing leader comprising:
    a resilient member which is manipulated to form a knot on the leader in surrounding relation thereto;
    an elongate tubular cover being positioned with the leader extending therethrough and with the knotted resilient member inside the tubular cover, the tubular cover further being constricted at both ends thereof to trap air inside the tubular cover.

2. The combination according to claim 1 wherein the resilient member comprises a tubular member having a center passage and wherein the knot is formed by inserting an end of the leader through the center passage of the tubular member in one direction and looping the leader around the outside of the tubular member and inserting the end of the leader into the center passage a second time in the same direction and further by then pulling the leader extending through the tubular member taut whereby the tubular member is frictionally knotted to the leader.

3. The combination according to claim 1 wherein the tubular cover is constructed of a thermoplastic, heat-shrinkable material.

4. The combination according to claim 3 wherein the ends of the tubular cover are constricted by heating the ends of the tubular cover.

5. The combination according to claim 1 wherein the resilient member includes a tubular member with a center passage, the tubular member having a first end and a second end, and wherein the knot is formed by inserting an end of the leader into the first end of the center passage, threading the leader through the wall from the center passage to a location outside the tubular member and then passing the leader through the center passage from the second end to the first end, around the wall of the first end and then threading the leader through the wall from outside the tubular member to the center passage and extending the leader through the center passage to exit at the second end, whereby when the leader is pulled taut the tubular member is frictionally knotted to the leader.

6. A fish strike indicator in combination with a fishing leader comprising:
    a resilient member which is manipulated to form a knot on the leader in surrounding relation thereto;
    a buoyant piece of material being positioned with the leader extending therethrough and with the knotted resilient member being positioned inside the buoyant material.

7. A method for making a fish strike indicator on a fishing leader, which comprises the steps of:
    (a) knotting a resilient member on the leader;
    (b) positioning a tubular cover on the leader with the knotted resilient member positioned inside the tubular cover; and (c) constricting opposite ends of the tubular cover to trap air within the tubular cover.

8. The method for making a fish strike indicator according to claim 7 wherein the resilient member includes a tubular member having a center passage and wherein the step of knotting the resilient member includes the steps of inserting an end of the leader through the center passage of the tubular member in one direction, threading the leader around an outside wall of the tube, threading the leader through the center passage of the tube in the same direction as before, and pulling the leader on opposite sides of the tubular member taut to form a knot of the tubular member on the leader.

9. The method for making a fish strike indicator according to claim 7 wherein the resilient member includes a tubular member with a center passage, the tubular member having a first end and a second end, and wherein the step of knotting the resilient member includes the steps of inserting an end of the leader into the first end of the center passage, threading the leader through the wall from the bore to a position outside the tubular member, passing the leader through the center passage from the second end to the first end, wrapping the leader around the end wall and threading the leader through the wall from outside the tubular member to the center passage, and extending the leader through the bore to exit at the second end, and further by then pulling the leader extending through the tubular member taut to form a knot of the tubular member on the leader.

10. The method for making a fish strike indicator according to claim 7, wherein the tubular cover is constructed of a thermoplastic, heat-shrinkable material, and the step of constricting the ends of the tubular cover includes the step of applying heat to the ends of the tubular cover.

* * * * *